J. C. BOYLE.
SYSTEM AND APPARATUS FOR STARTING INTERNAL COMBUSTION ENGINES.
APPLICATION FILED MAR. 26, 1910.
1,022,926.
Patented Apr. 9, 1912.
4 SHEETS—SHEET 1.
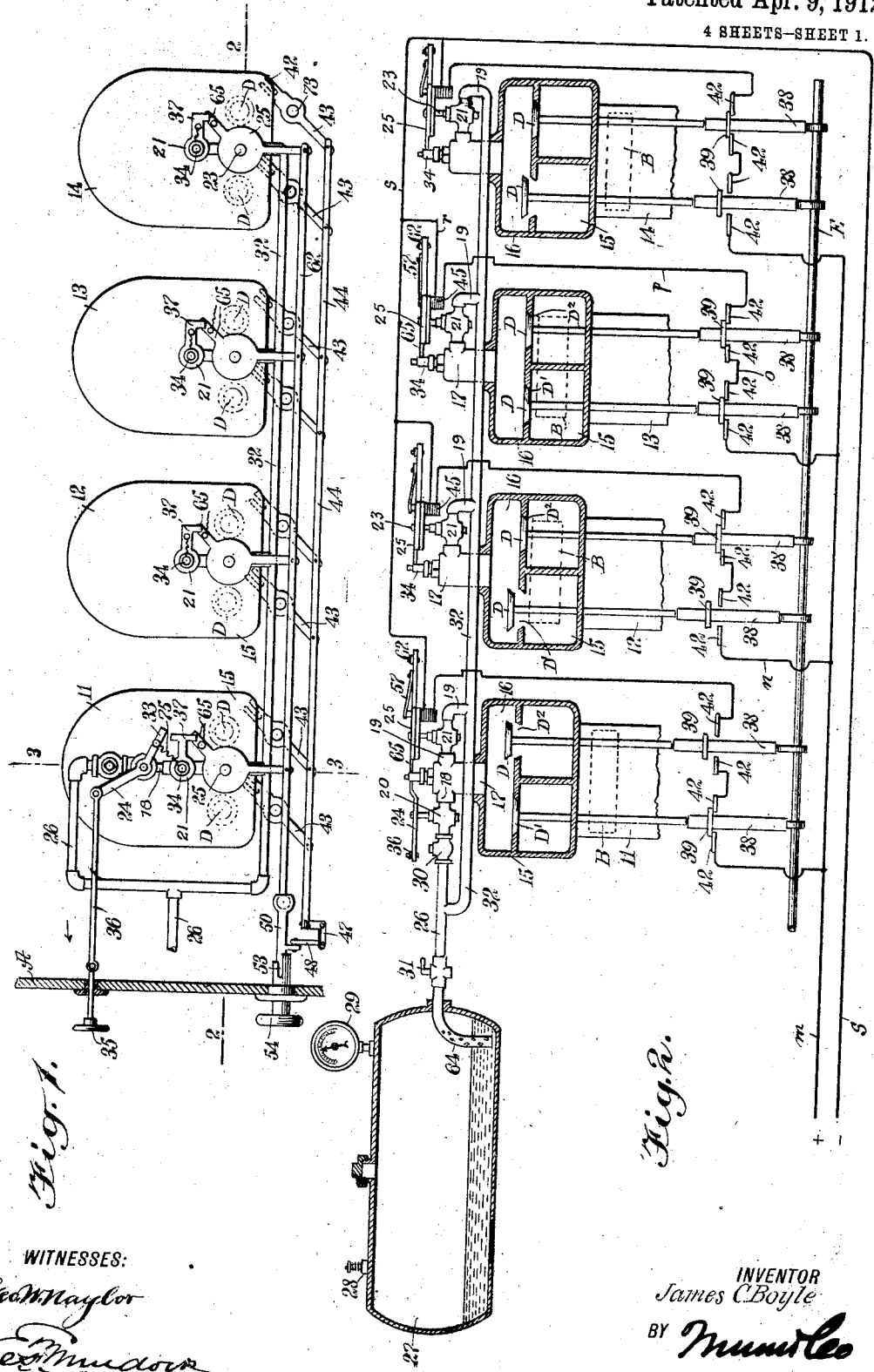
WITNESSES:
INVENTOR
James C. Boyle
BY
ATTORNEYS

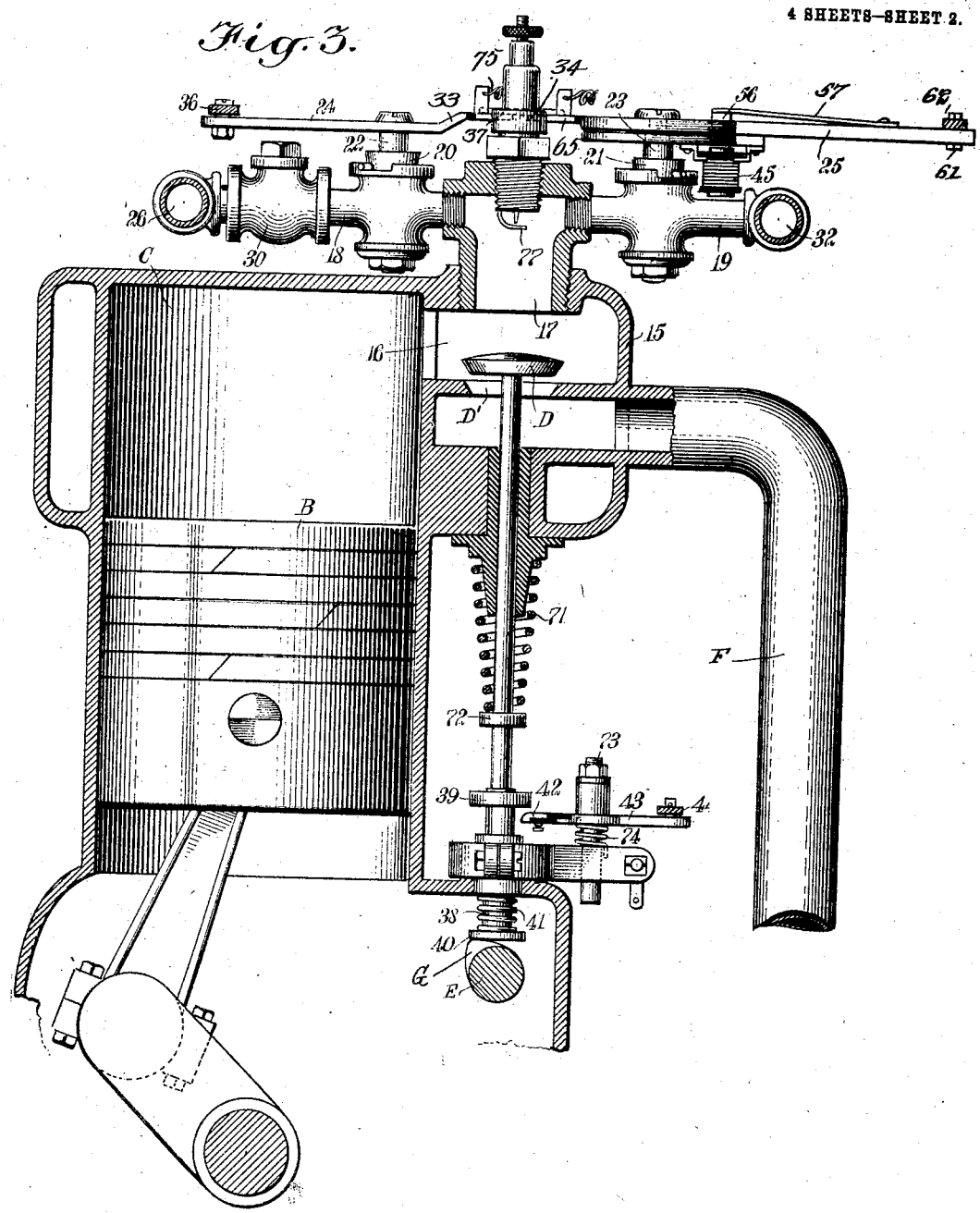

J. C. BOYLE.
SYSTEM AND APPARATUS FOR STARTING INTERNAL COMBUSTION ENGINES.
APPLICATION FILED MAR. 26, 1910.
1,022,926.
Patented Apr. 9, 1912.
4 SHEETS—SHEET 3.
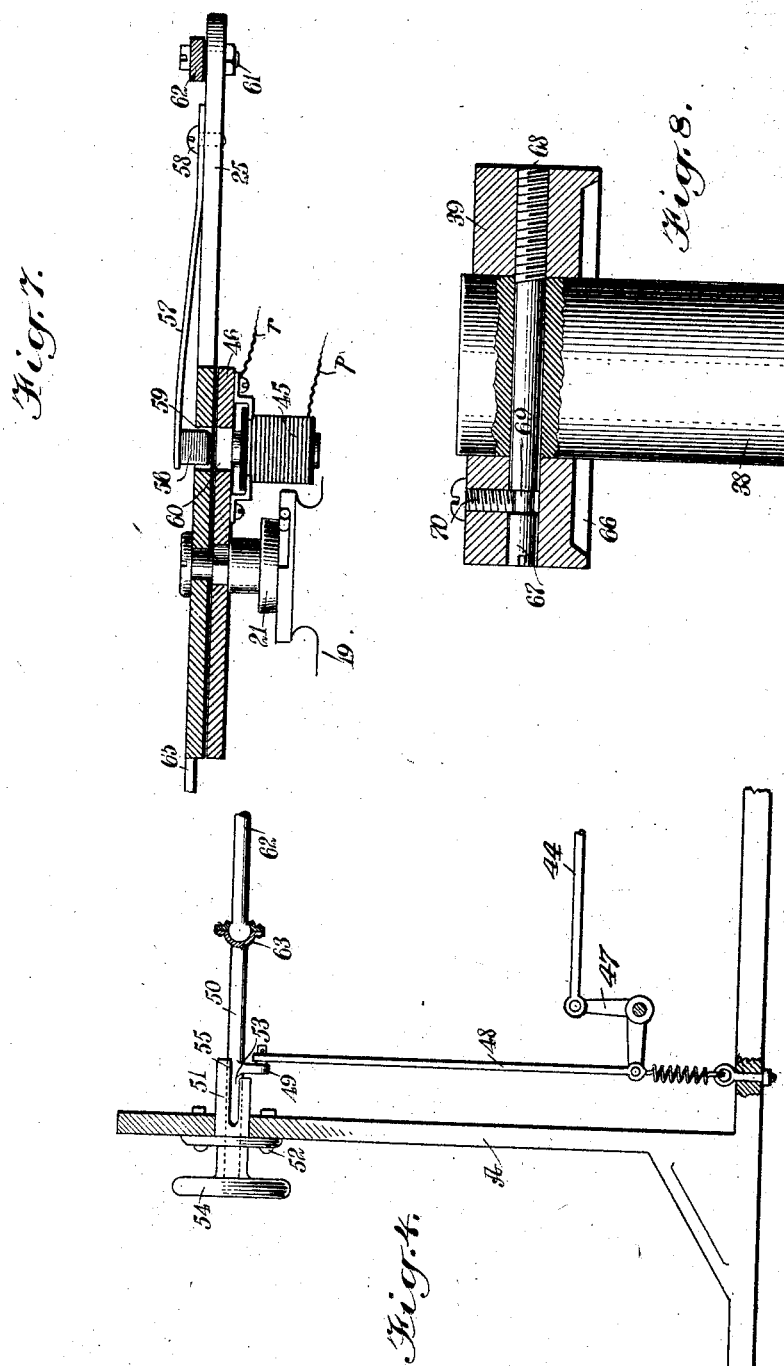
WITNESSES:
INVENTOR
James C. Boyle
BY
ATTORNEYS

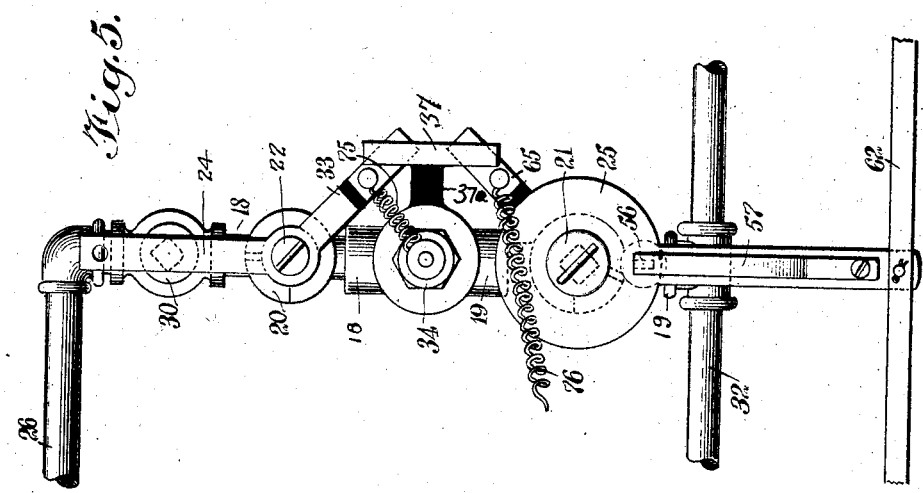

UNITED STATES PATENT OFFICE.

JAMES C. BOYLE, OF CALGARY, ALBERTA, CANADA.

SYSTEM AND APPARATUS FOR STARTING INTERNAL-COMBUSTION ENGINES.

1,022,926.  Specification of Letters Patent.  Patented Apr. 9, 1912.

Application filed March 26, 1910. Serial No. 551,610.

*To all whom it may concern:*

Be it known that I, JAMES C. BOYLE, a citizen of the Dominion of Canada, and a resident of Calgary, in the Province of Alberta and Dominion of Canada, have invented a new and Improved System and Apparatus for Starting Internal-Combustion Engines, of which the following is a full, clear, and exact description.

Among the principal objects which the present invention has in view are: to provide a system for storing gas under compression to be admitted to an engine cylinder when the mechanical parts thereof are in position to receive an operative explosion therein; to provide means for introducing gas under pressure to the cylinder of an engine of the type specified when the piston thereof is in position to receive the explosive impact; to provide means for compressing gas for introduction into cylinders of engines of the character specified, utilizing therefor the piston of said engine; to provide means in an internal combustion engine employing a plurality of power cylinders, for selectively controlling the passage of gas therein to that cylinder only wherein the intake and exhaust ports are closed; and to provide means for insuring the richness of the gas when delivered from the compression system.

One embodiment of the present invention is disclosed in the structure illustrated in the accompanying drawings, in which like characters of reference denote corresponding parts in all the views, and in which—

Figure 1 is a plan view of a multiple unit internal combustion engine having applied thereto a starting system constructed and arranged in accordance with the present invention; Fig. 2 is a vertical section taken on the line 2—2 in Fig. 1, the valves, electrical contacts and valve operating mechanism being shown in partly diagrammatic manner to the more clearly indicate the correlated action of the various members; Fig. 3 is a vertical section of the cylinder and valve chamber of an internal combustion engine having applied thereto a starting system constructed and arranged in accordance with the present invention, the section being taken on the line 3—3 in Fig. 1; Fig. 4 is a detail view in vertical section, illustrating the operating device for admitting the charge to a dead engine; Fig. 5 is a detail view in plan, showing the arrangement of the inlet and outlet ducts of the unit cylinder employed as a compression pump, together with electrical devices for controlling the ignition system; Fig. 6 is a detail view in plan, of adjustable electrical contacts for controlling the admission cock of the compressed gas delivery system; Fig. 7 is a detail view in cross section, of the head of the cock controlling the inlet of gas under compression to the various cylinders; and Fig. 8 is a detail view in vertical cross section of the contact collar mounted on the lifting pins of the cock operating mechanism.

The present invention is particularly applicable to the multiple unit type of engine, and consists in the employment for short periods of one of the cylinders as a compression pump for holding the explosive mixture under compression at which the same may be exploded when introduced in the various explosion cylinders of the engine. For this purpose, one of the cylinders, that indicated in the present drawings as 11, is connected by means of a pipe 26 with a reservoir 27. During such operation on the part of the cylinder 11 the reservoir 27 is in open communication with the cylinder of the engine and the explosive chamber C thereof. It is to control the opening of the pipe 26 that 1 have provided the valve 20, and the lever 24 and rod 36 for turning the said valve. The rod 36 is suitably mounted in the dashboard A of the automobile, and is provided with a handle 35 on the inner side of the said dashboard.

When in the operation of the machine the rod 36 is drawn in the direction shown by the arrow in Fig. 1 of the drawings, the valve 20 is rotated to open the communication between the chamber C of the cylinder 11 through the pipe 26 with the reservoir 27. Interposed between the valve 20 and the reservoir 27 is a check valve 30 of any suitable and usual construction.

It will be understood that when the valve 20 is open during the operation of the engine of which the cylinder 11 forms a part, the crank shaft of the said engine has imparted thereto its rotary motion by the other cylinders of the engine. During the operation of the crank shaft of the engine the lay shaft E lifts, in the regular intervals, the intake and exhaust valves D, D of the cylinder 11 in the same manner as when the said cylinder 11 is receiving, compressing and exploding the fuel charge. It is to prevent the ignition of the fuel charge that the ignition circuit controlling the explosion in the cylinder 11 is broken during such time as the said cylinder is employed as a pump. The electric circuit connecting the spark terminals 77 with the sparking mechanism embodies the wiper 37 and the arm 33 which is integrally formed with the lever 24. The arm 33 and lever 24 are so arranged that as the said lever 24 is rotated to open the valve 20 the arm 33 passes out of contact with the wiper 37, therefore breaking the electric circuit used for producing the explosion in the chamber C of the cylinder 11. The electric circuit referred to includes the coil wire 75, which is connected with the arm 33 and to the structure of the spark plug which is electrically connected with one of the terminals 77 which is insulated from the frame of the engine. The said circuit also includes the coil wire 76, which is electrically connected to the extension 65 of the lever 25. The extension 65 and the arm 33, as shown in Fig. 5 of the drawings, each forms a metallic and electric contact with the wiper 37. The wiper 37, it will be understood, is insulated at 37ª from the frame of the engine and forms a bridge between the arm 33 and the extension 65. The terminal 77 opposite that with which the wire 75 is connected, is electrically connected with the frame of the engine. The frame of the engine is suitably connected with one pole of an electric source, not shown in the drawings. The wire 76 is connected with the opposite pole of this electric source, thus completing the sparking circuit through the terminal 77. It will be understood that the usual construction for circuits of this character having magnetos and spark sustainers, may be employed. The end of the extension 65 which contacts with the wiper 37, must be insulated from the lever 25 of the frame of the engine.

The fuel charge is supplied to the cylinders 11, 12, 13 and 14 by means of a supply pipe F which connects with the valve chest 15, entering the same below the valves D, D. The upper chamber 16 of the valve chest 15 in each of the cylinders is perforated to receive a union 17. The unions 17 form a connection for the pipes 18 and 19 with the cylinder 11 and the explosive chamber thereof. In each of the cylinders 12, 13 and 14 the union 17 connects with the pipe 19 only. The pipe 19 is connected with the pipe 32, which pipe is connected with reservoir 27. Each of the pipes 19 has mounted thereon a valve 21, which valves are operated by the levers 25 under certain conditions to be hereinafter set forth, the said levers being connected with the rod 62, which rod is manually operated by means of the handle 54 mounted in the dashboard A of the automobile, as seen in Fig. 1 of the drawings.

When in the course of operation of an engine thus constructed and arranged the chauffeur desires to employ the cylinder 11 for the purpose of increasing the pressure of the explosive fuel in the reservoir 27, he reaches forward, grasping the handle 35 to draw the same inward, thereby moving the lever 24 and the valve 20 connected therewith to open the communication between the pipe 26 and the reservoir 27, the check valve 30 opening on the reservoir side of its seat. As explained, the mechanical operation of the valves D, D and lay shaft E continues as though the cylinder 11 was performing its function as a crank driving member. As stated, the spark plug 77 is disconnected from the electric source, and while the arm 33 is separated from the wiper 37 the spark in the cylinder 11 is discontinued. While the cylinder 11 is thus arranged the fuel charge is taken into the cylinder, and by the action of the piston B ejected outward therefrom through the chamber 16, the union 17, pipes 18 and 26, into the reservoir 27 and against the pressure thereof. This operation will continue until the pressure in the reservoir equals the pressure of the explosive compression in each of the cylinders 11 to 14 inclusive. This pressure is ascertained or shown in the gage 29. It is to prevent undue pressure being introduced in the reservoir that the same is provided with a safety valve 28 of any approved type.

When, in the opinion of the chauffeur, the fuel in the reservoir 27 is under sufficient pressure the handle 35 is moved to close the valve 20, cutting off the communication between the chamber C of the cylinder 11 and the reservoir. In closing the valve 20 the arm 33 is moved into contact with the wiper 37, and the electric sparking circuit through the terminals 77 of the spark plug 34 is reestablished. From this point on the cylinder 11 becomes an explosive engine unit exploding its fuel charges in manner similar to and in timed relation with the other cylinders 12, 13 and 14.

The compressed fuel contained in the reservoir 27 is utilized for charging one of the cylinders 11 to 14 inclusive for the purpose of starting the engine. To do this the levers 25 are shifted to rotate one of the valves 21, 21 mounted on the pipes 19 to admit a fuel charge from the pipe 32 and reservoir 27 to the chamber C of the cylinder in which the valves D, D are both closed, and in which cylinder the parts are in position to receive an explosion. It will be seen that the charge when thus introduced to the ready cylinder is of a compression approximating nearly the usual compression under which the engine works. It is to prevent the ignition of the charge that I have provided the extension 65 therefrom, which extension forms a part of the igniting circuit when in contact with the wiper 37. The levers 25, when moved to open the valves 21, are rotated so that the extension 65 is moved out of contact with the said wiper and the various plugs 34 are then cut out of the electric circuit. It is during this period that the fuel is transferred from the reservoir 27 through the pipe 32 to one of the cylinders 11, 12, 13, 14. After the interval necessary to charge the said cylinder the rod 62 is manipulated by the handle 54 to close the said valves 21, imprisoning the fuel charge in the cylinder which received the same. In closing the valves 21 the extension 65 is brought in contact with the wiper 37, thereby reestablishing the sparking electric circuit. By advancing or manipulating the sparking mechanism as in the usual manner the ignition spark may now be produced by the chauffeur, when the fuel charge delivered to the cylinder is exploded, causing the piston B in the said cylinder to move outward on its power stroke, and to rotate the crank shaft to operate the other cylinders of the engine. If it should happen that one charge of one cylinder is not sufficient to start the engine, the charge may be repeated in the same cylinder by again manipulating the handle 54 and the rod 62 connected therewith to open the valve 21 on said cylinder in the manner described, to transfer a second charge of explosive fuel from the reservoir 27 to the said cylinder. The action as above described is again repeated, being impossible to ignite the charge until the rod 62 is manipulated to close the valves 21.

The electrical connections shown best in Fig. 6 of the drawings are employed to operate only on the cylinder where both of the valves D, D are firmly seated, in which position the cylinder is prepared to receive a fuel charge.

In the present invention I have interposed between the valve stems and the cams of the lay shaft E lift pins 38, 38. The pins 38, 38 are provided at their upper ends with a disk 39. The disk 39 is hollowed on the under side to form a narrow edged downturned flange 66. The disk 39 is held in position on the pin 38 by means of a screw 67, the threaded end 68 whereof engages a threaded perforation on one side of the disk 39. At near the saw-cut end of the said screw 67 is provided a groove 69 to receive the end of a lock screw 70, which is threaded to engage a threaded perforation in the disk 39, substantially as shown in Fig. 8 of the drawings. The pin 38 is independently mounted in the frame of the engine, and is provided with a shoe 40. The shoe 40 is held down upon the surface of the cam G by means of a spiral spring 41. The pins 38 provide a clearance of approximately $\tfrac{1}{32}$nd of an inch between the lower ends of the valve stems and the top of the pins 38, and when the said stems and pins are in their lowermost position. It is in this position of the pins that the disks 39 will form electrical contact with the ends 42, 42 of the levers 43, 43.

There is a lever 43 provided for each of the valves D, D. The levers 43 are pivotally mounted, as shown in Fig. 6 of the drawings, and are connected with the rod 44 to maintain the relative position substantially as shown in said Fig. 6. The rod 44 is connected with the plunger 50 by means of a crank arm 49, a pull rod 48 and a bell crank 47, which bell crank is pivotally mounted in suitable relation upon the frame of the automobile. The bell crank 47 and rods connected therewith are held in the normal position shown in full lines in Fig. 6 by means of a spiral spring 47ª.

The plunger 50 is connected with the rod 62 by means of the ball and socket joint 63 and is slidably mounted in the thimble 51. The thimble 51 is provided with a slot 53 to receive in guided relation the arm 49 formed on the plunger 50. The arm 49 which is connected with the bell crank 47 by the rod 48 is normally held in the position shown in Fig. 4 of the drawings. In this position the rod 44 is moved to throw the levers 43 out of the path of the collars 39. When to draw upon the rod 62 the plunger 50 is rotated to draw the arm 49 into the slot 53, the rod 48 and arm of the bell crank 47 to which it is connected are lifted which throws the rod 44 away from the pivot of the bell crank and rocks the levers 43 to insert the ends 42 in the path of the collars 39.

It will be understood that the connection between the bell crank 47 and the rod 48 is sufficiently flexible to permit the said rod to sway laterally at the end connected with the arm 49. It will also be understood that when the arm 49 is disposed in a horizontal position the connecting pin on the said arm is sufficiently removed from the plunger 50 to avoid contact with the rod 48 when the arm 49 is drawn within the slot 53.

The above described action of the handle 54, plunger 50 and arm 49 insures that the rod 44 is thrust forward to rotate the levers 43, 43 to present the ends 42, 42 under the flange 66 of each disk 39 preliminary to the pull of the rod 62, which throws the levers 25 to open the valves 21.

Each lever 25 is connected with an electric source by a metallic circuit embodying the ends 42, 42, the connecting wire o, the circuit wires n and p and the electro-magnets 45. Each magnet 45 is fixedly mounted upon a disk 46. The lever 25 is perforated directly above the core of the magnet to receive a head 56 which is fixedly mounted in the end of a spring 57. The spring 57 is fixedly mounted upon the lever 25, as best shown in Figs. 3 and 5 of the drawings.

The head 56 is constructed from suitable material to operate as an armature for the said magnet 45. The head 56 is depressed through the disk 46 fixedly mounted on the stem of the valve 21 and supporting the lever 25, which lever is pivotally mounted on the said valve stem. When the head 56 is drawn downward into the perforation provided in the disk 46, the disk 46, extension 65 and valve 21 are rotated with the said lever 25. The disk 46 and lever 25 are thus rotated when the electric circuit is completed through any set of ends 42, 42, terminal wires $n$ and $p$, connecting wire $o$ and the magnet 45. The circuit is completed on that one of the cylinders 11, 12, 13, 14 in which the two valves D, D are both seated, and the disks 39, 39 under the said valves are in contact with the ends 42, 42 on the levers 43, 43 belonging to said cylinder. In the drawings, and in Fig. 2, this position is illustrated as relating to cylinder 13.

When the parts of the engine are disposed as illustrated in Fig. 2 of the drawings, and the chauffeur desires to charge one of the cylinders of his engine, he rotates the handle 54 and plunger 50 connected therewith so that he may retract the said handle and the rod 62 to throw open the valves 21, 21. In doing this he rotates the various levers 43 under the various disks 39 to cause contact between the said levers and disks, provided the disks are in position to make contact. In this manner there is selected the cylinder which is in condition to receive the charge. As shown in Fig. 2 of the drawings this cylinder is designated 13. The circuit is then established between the main $m$, the branch wire $n$, the ends 42 on the one lever 43, through the connecting wire $o$ to the end 42 of the other lever 43, through the branch wire $p$, through the magnet 45, the branch wire $r$, the main $s$ and the electric source, whatever that may be. The circuits in each of the other cylinders 11, 12 and 14 are not completed, therefore the magnet 45 on the lever 25 assigned to the cylinder 13 locks the said lever 25 and the disk 46 in operative position. When now the chauffeur pulls the handle 54, plunger 50 and rod 62 to rotate the levers 25, 25 it is only the one lever 25 which turns the disk 46, and that is the one connected with the cylinder 13 in which the two valves 21, 21 are seated. As above described, after the charging of the cylinder the handle 54 and parts connected therewith are returned to the normal position, leaving the charge under pressure in the cylinder 13, and reëstablishing the ignition circuit to explode the charge within the said cylinder or to place the same in condition to be ignited by advancing the spark, or otherwise.

The levers 43 are mounted upon pivots 73, and are supported by springs 74.

Having thus described my invention, what I claim as new and desire to secure by Letters Patent is:—

1. A multi-cylinder internal combustion engine and starting means therefor comprising intake and exhaust valves for each cylinder; a reservoir for compressed explosive fuel; conduits connecting each of said cylinders and said reservoir; controls for said conduits; means for operating said controls to open said conduits singly; and means for selecting the one of said controls to be operated, said means including the intake and exhaust valves of each cylinder when both are in closed position in one cylinder.

2. A multi-cylinder internal combustion engine and starting means therefor comprising intake and exhaust valves for each cylinder; a reservoir for compressed explosive fuel; conduits connecting each of said cylinders and said reservoir; a plurality of valves disposed in said conduits; a connecting rod normally disengaged from each of the said valves and adapted for engagement therewith; an electro-actuated means for engaging said valves with said rod singly, said means being disposed in operative position when the intake and exhaust valves in one of said cylinders are closed.

3. In a multi-cylinder internal combustion engine and starting means therefor embodying a reservoir for compressed explosive fuel; conduits connecting each of said cylinders and said reservoir; a plurality of valves for said conduits; a plurality of levers loosely mounted one on each of said valves; a plurality of members, one fixedly mounted on each of said valves adjacent said levers; locking mechanisms electro-actuated to lock said members and said levers; and a plurality of electric circuits for actuating said locking mechanisms, each of said circuits being completed when the intake valve and exhaust valve in any one cylinder are in closed position.

4. In a multi-cylinder internal combustion engine and starting means therefor embodying a reservoir for compressed explosive fuel; conduits connecting each of said cylinders and said reservoir; a plurality of valves for said conduits; a plurality of levers loosely mounted one on each of said valves; a plurality of members, one fixedly mounted on each of said valves adjacent said levers; locking mechanisms electro-actuated to lock said members and said levers; a plurality of electric circuits for actuating said locking mechanisms embodying the valve stems of the intake and exhaust valves of said engine and only when said valves are in closed position; and manually operable means for closing said circuits.

5. In a multi-cylinder internal combustion engine and starting means therefor embodying a reservoir for compressed explosive fuel; conduits connecting each of said cylinders and said reservoir; a plurality of valves for said conduits; a plurality of levers loosely mounted one on each of said valves; a plurality of members, one fixedly mounted on each of said valves adjacent said levers; locking mechanisms electro-actuated to lock said members and said levers; a plurality of electric circuits for actuating said locking mechanisms embodying the valve stems of the intake and exhaust valves only when said valves are in closed position; and means manually and simultaneously operable for closing the one of said circuits to operate the locking mechanism connected with the cylinder in which both the intake and exhaust valves are closed, and to shift the lever connected with one of the said members by said actuated locking mechanism to open the valve in that cylinder.

6. In a multi-cylinder internal combustion engine and starting means therefor; a plurality of explosive fuel supply valves, means for opening said valves, electro-actuated locks to connect said means for opening said valves and a plurality of connected electric switches for operating said locks, the contact ends of said switches being bifurcated and electrically unconnected, said bifurcated ends being adapted for electric connection by the stems of the engine valves.

7. In a multi-cylinder internal combustion engine and starting means therefor, a reservoir for compressed explosive fuel, conduits connecting each of said cylinders and said reservoir, and a plurality of valves for said conduits; a plurality of switches each having bifurcated ends, said ends being electrically disconnected and adapted for connection by contact with the stems of the intake and exhaust valves of said cylinders; an electric connection between one of the bifurcated ends of one switch and one of the bifurcated ends of the other switch; and means for moving said switch into contact with said valve stems when said valves are closed.

In testimony whereof I have signed this specification in the presence of two subscribing witnesses.

JAMES C. BOYLE.

Witnesses:
F. H. HONEYWELL,
J. F. ROCHESTER.

---

Copies of this patent may be obtained for five cents each, by addressing the "Commissioner of Patents, Washington, D. C."